United States Patent [19]
Malion et al.

[11] 3,837,450
[45] Sept. 24, 1974

[54] CLUTCH BRAKE MECHANISM WITH A LOST MOTION CONNECTION

[76] Inventors: William R. Malion, Box 69, Willoughby, Ohio 44094; John E. Watkins, 9674 Fairmount Rd., Novelty, Ohio 44072

[22] Filed: Nov. 6, 1972

[21] Appl. No.: 304,046

[52] U.S. Cl......... 192/12 BA, 192/17 D, 192/33 C, 192/35, 192/41 S, 192/81 C
[51] Int. Cl. ... F16d 67/02, F16d 43/00, F16d 13/04
[58] Field of Search ........... 192/12 BA, 17 D, 33 C, 192/35, 36, 41 S, 81 C, 26

[56] References Cited
UNITED STATES PATENTS

| | | | |
|---|---|---|---|
| 2,951,568 | 9/1960 | Hungerford, Jr. et al...... | 192/12 BA |
| 2,984,325 | 5/1961 | Tomko et al...................... | 192/81 C |
| 3,153,352 | 10/1964 | Sajovec, Jr. et al............... | 192/81 C |
| 3,373,851 | 3/1968 | Baer................................ | 192/12 BA |
| 3,451,512 | 6/1969 | Sacchini et al.................. | 192/12 BA |
| 3,472,346 | 10/1969 | Nagel................................ | 192/35 |
| 3,493,088 | 2/1970 | Hoff................................. | 192/26 |
| 3,521,730 | 7/1970 | Weatherby..................... | 192/12 BA |
| 3,559,781 | 2/1971 | Brunelle......................... | 192/12 BA |
| 3,648,810 | 3/1972 | Weatherby...................... | 192/36 X |

*Primary Examiner*—Samuel Scott
*Assistant Examiner*—Lance W. Chandler
*Attorney, Agent, or Firm*—Watts, Hoffman, Fisher & Heinke Co.

[57] ABSTRACT

A clutch brake mechanism including input and output members normally drivingly connected by a helical coil spring disposed therearound. One end of the spring is connected to the output member. The other end connects with a sleeve disposed around the spring. A braking system is operable to selectively brake the rotation of the sleeve whereby the ends of the spring are rotated relative to each other, releasing the grip of the spring coils about the input member and interrupting the driving connection normally provided by the spring. In one embodiment, the braking system is operative to brake the sleeve only when actuated while in another embodiment, the braking system is of the "deadman" type, normally braking the sleeve. A lost-motion connection between the sleeve and the output member limits the twisting of the spring during braking and assures positive braking of the output member, even in the event of failure of the spring.

1 Claim, 6 Drawing Figures

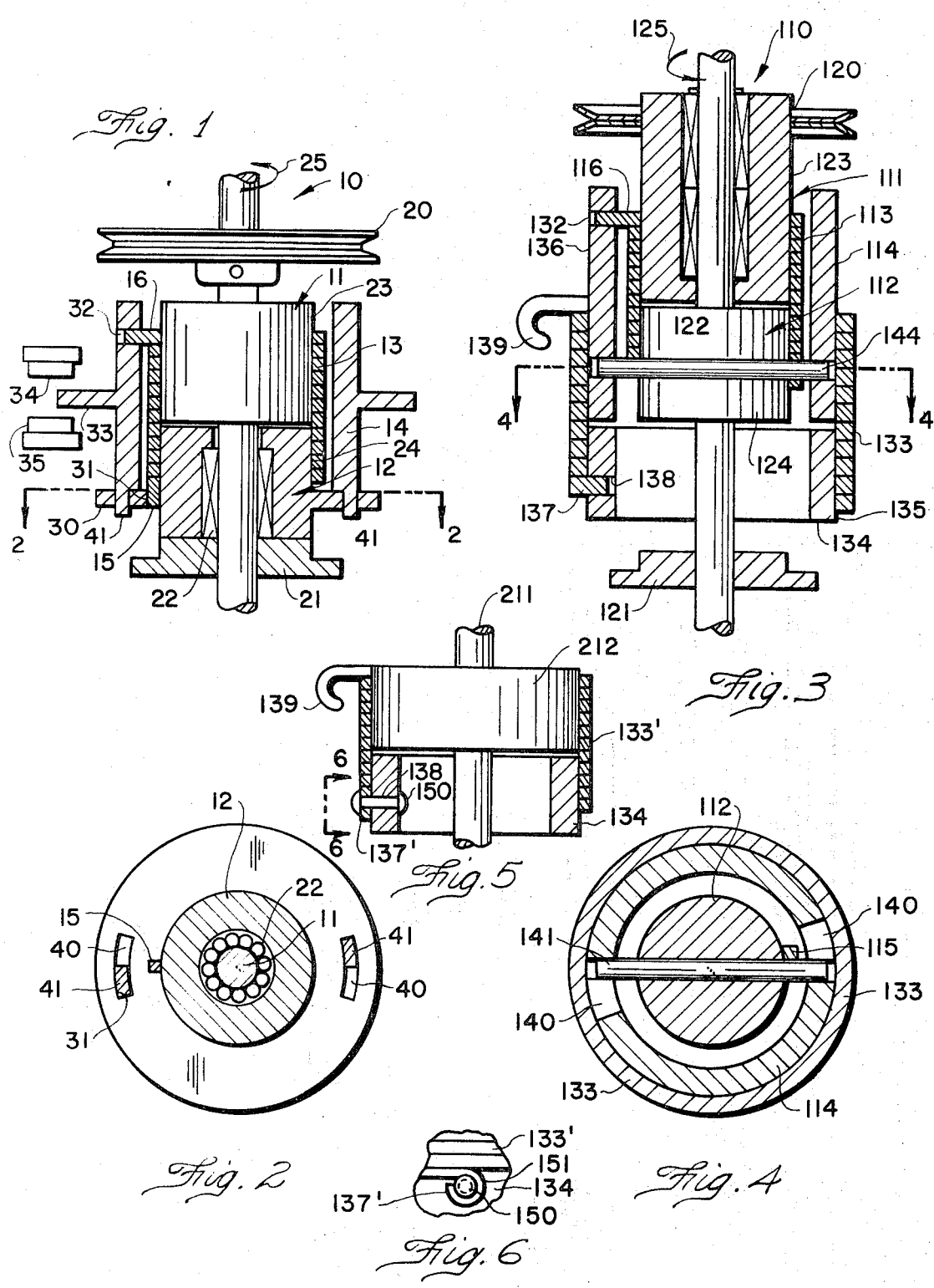

CLUTCH BRAKE MECHANISM WITH A LOST MOTION CONNECTION

BACKGROUND OF THE INVENTION

1. Field of the Invention

The present invention relates generally to a novel and improved clutch brake mechanism employing a coil spring to drivingly connect input and output members, and including a braking system to selectively interrupt the driving connection and to brake the rotation of the output member.

2. Prior Art

Clutch brake mechanisms are known which are operable selectively in one of two modes to either drivingly connect input and output elements for concurrent rotation or to brake the output. Most of such known mechanisms comprise relatively complex assemblies which are expensive and which occupy a substantial amount of space.

There is an increasing need for a relatively simple clutch brake mechanism which can be installed as a safety device in the drive trains of such devices as have commonly been directly driven. By way of example, rotary lawnmowers have, for years, utilized a rotating blade which is directly coupled to an engine drive shaft. The rotation of the blade is stopped only when the engine is stopped. It is desirable to interpose a clutch brake mechanism in the drive train which will be operative in the fashion of a "deadman brake" to brake blade rotation except when the operator actuates a control. By this arrangement, when the operator releases the control and leaves the region of the lawnmower handle upon which the clutch brake control is mounted, the blade will be braked thereby reducing the likelihood of the operator being injured by the blade in attaching or removing grass bags, etc.

SUMMARY OF THE INVENTION

The present invention overcomes the foregoing drawbacks of the prior art and provides a novel and improved clutch brake mechanism utilizing a coil spring to drivingly couple an input member and an output member. A braking device operates on a sleeve positioned around and connected to the coil spring to interrupt the driving connection provided by the spring and to brake the output. In one embodiment the braking device is operative to provide a normally engaged, "deadman" type brake. In another embodiment, the spring normally drivingly connects the input and output, and the braking device is inoperative to interrupt the driving connection until brought into braking engagement with the sleeve.

Clutch brake mechanisms constructed in accordance with the present invention are typically characterized by four elements: (1) an input member; (2) an output member; (3) a spring connected to the output member for rotation therewith and extending around and in engagement with the input member to establish a driving connection between the input and output members; and (4) a braking structure including a sleeve positioned around and connected to the spring for rotation therewith and a restraining device selectively engageable with the sleeve to restrain the movement of the sleeve thereby interrupting the driving connection provided by the spring and braking the output member.

Preferably the input and output members have cylindrical portions of similar diameter positioned near each other and rotatable about a common axis concentric with the cylindrical portions. A helical coil spring extends around the cylindrical portions in firm engagement therewith. The end region of the spring which extends around the output member is connected to the output member. The other end region of the spring wraps around the input member and connects with a sleeve positioned concentrically about the input member. By this arrangement, the interconnection between the output member and the spring and between the sleeve and the spring assures that the sleeve and the spring will rotate with the output member.

Braking of the output member is achieved by braking the rotation of the sleeve. The initial braking force serves to release the grip of the spring coils about the input member thereby interrupting the driving connection provided by the spring between the input and output members. As the rotation of the sleeve is braked to a halt, the output member, which is connected to sleeve by the spring, is likewise braked.

In one embodiment, the braking system is normally disengaged from the sleeve and accordingly serves to brake the output only when brought into operative braking engagement with the sleeve. In another embodiment, the braking system is normally operative in the manner of a "deadman brake" to brake the output and permits the output to rotate with the input only when deliberately released. Either embodiment can employ, as the means for engaging the sleeve, a second coil spring, the ends of which can be rotated relative to each other to selectively release for rotation or engage and brake the rotation of the sleeve. More conventional brake constructions can also be used where, for example, a radially extending flange is formed on the sleeve and is selectively engaged or disengaged by a clamping-type brake system.

In accordance with another aspect of the present invention, a lost-motion connection is provided between the sleeve and the output member. This connection is arranged such that during the initial braking of the sleeve, the sleeve rotates a small amount relative to the output member to twist the spring and release its grip about the input member. The lost-motion connection then takes effect to rigidly connect the sleeve and the output member such that further braking forces are not imposed on the spring but are rather delivered directly from the sleeve to the output member. Such an arrangement assures that the spring will not be subjected to force overloads and assures a positive braking action even in the event of spring breakage.

Accordingly, it is a general object of the present invention to provide a novel and improved clutch brake mechanism.

Other objects and features will become apparent and a better understanding of the invention will be obtained from the following description and claims when considered in conjunction with the accompanying drawing.

BRIEF DESCRIPTION OF THE DRAWING

FIG. 1 is a cross sectional view of one embodiment of a clutch brake mechanism constructed in accordance with the present invention;

FIG. 2 is a cross sectional view of the clutch brake mechanism as seen from the plane indicated by the line 2 — 2 in FIG. 1;

FIG. 3 is a cross-sectional view of another embodiment of a clutch brake mechanism constructed in accordance with the present invention;

FIG. 4 is a cross sectional view of the clutch brake mechanism of FIG. 3 as seen from the plane indicated by line 4 — 4 in FIG. 3;

FIG. 5 is a cross-sectional view of the clutch brake mechanism of FIG. 3 converted in accordance with the present invention to a brake mechanism; and, FIG. 6 is a partial side elevational view as seen from the plane indicated by the line 6 — 6 in FIG. 5.

DESCRIPTION OF THE PREFERRED EMBODIMENT

Referring to FIGS. 1 and 3, two embodiments of clutch brake mechanisms are shown generally at 10 and 110. The mechanisms 10, 110 have several elements in common including input members 11, 111, output members 12, 112, helical coil springs 13, 113, and sleeves 14, 114. The springs 13, 113 are disposed around and in firm engagement with portions of their respective input members 11, 111 and output members 12, 112. The output ends 15, 115 of the springs 13, 113 are connected, as will be explained, to the output members 12, 112 for concurrent rotation therewith. The input ends 16, 116 are connected, as will be explained, to the sleeves 14, 114. By this arrangement, the springs 13, 113 are normally operative to drivingly connect the input members 11, 111 to the output members 12, 112. When the rotation of the sleeves 14, 114 is braked, however, the interconnection between the sleeves 14, 114 and the input ends 16, 116 of the springs 13, 113 causes the input ends 16, 116 to be twisted relative to the output ends 15, 115 thereby loosening the grip of the spring coils about the input members 11, 111 and interrupting the driving connection provided by the springs 13, 113.

As will be explained, different types of braking systems are used on the embodiments illustrated in FIGS. 1 and 3 to brake the sleeves 14, 114, and lost-motion connections are provided between the sleeves 14, 114 and the output members 12, 112 to limit the twisting deflection of the springs 13, 113 and to assure a positive braking of the output members 12, 112.

Referring particularly to the embodiment illustrated in FIGS. 1 and 2, the input member 11 comprises a shaft rigidly mounting a drive pulley 20 and rotatably mounting the output member 12. The output member 12 comprises an annular structure having an output flange 21 formed integrally therewith. A roller bearing 22 is interposed between the input and output members 11, 12 to facilitate their relative rotation.

Cylindrical aligned surface portions 23, 24 of similar diameter are formed on the input and output members 11, 12. The helical coil spring 13 is positioned around and engages the surface portions 23, 24. By this arrangement, when the input member 11 is rotated in the direction in which the spring coils are wound as they extend onto the input member 11, as indicated by the arrow 25, the frictional engagement between the spring coils and the members 11, 12 will cause the coils to tighten about the members 11, 12 and provide a driving connection therebetween.

The output end 15 of the spring 13 is connected to the output member 12. A radially extending flange 30 is formed integrally with the output member 12. The flange 30 is apertured at 31, and the output end 15 of the spring 13 depends through the aperture 31, thereby locking the spring 13 and the output member 12 together for concurrent rotation.

The input end 16 of the spring 13 is connected to the sleeve 14. The sleeve 14 is apertured at 32. The input end 16 extends radially outwardly and into the aperture 32, thereby locking the spring 13 and the sleeve 14 together for concurrent rotation.

The sleeve 14 is provided with a radially extending braking flange 33. A clamp-type braking system indicated schematically as including a pair of movably mounted opposed jaws 34, 35, is engageable with the flange 33. When the jaws 34, 35 are brought into braking engagement with the flange 33, rotation of the sleeve 14 is braked, thereby twisting the input end 16 of the spring 13 relative to the output end 15 and releasing the grip of the spring coils on the input member 11. In this way, the driving connection between the input and output members 11, 12 is interrupted and the sleeve 14, the spring 13, and the output member 12 are braked to a halt.

A lost-motion connection is provided between the sleeve 14 and the output member 12. Two arcuate slots 40 are formed in the flange 30, as best seen in FIG. 2. A pair of axially extending projections 41 are formed on the sleeve 14 and depend into the slots 40. The projections 41 each normally engage one end of the slots 40 but rotate during braking action into engagement with the opposite ends of the slots 40. By this arrangement, a lost-motion connection is provided which limits the twisting deflection of the spring 13 during braking, and also provides for positive braking of the output member 12, even if the spring 13 should fail.

Referring now to the embodiment of FIGS. 3 and 4, the output member 112 comprises a shaft rigidly mounting an output flange 121 and rotatably mounting the input member 111. The input member 111 comprises an annular structure rigidly mounting a drive pulley 120. A roller bearing 122 is interposed between the input and output members 111, 112 to facilitate their relative rotation.

Cylindrical aligned surface portions 123, 124 of similar diameter are formed on the input and output members 111, 112. The helical coil spring 113 is positioned around and engages the surface portions 123, 124. By this arrangement, when the input member 111 is rotated in the direction in which the spring coils are wound as they extend onto the input member 111, as indicated by the arrow 125, the frictional engagement between the spring coils and the members 111, 112 will cause the coils to tighten about the members 111, 112 and provide a driving connection therebetween.

The output end 115 of the spring 113 is connected to the output member 112. As will be explained, a pin 141 extends radially through the output member 112 to form part of a lost-motion connection between the sleeve 114 and the output member 112. The output end 115 of the spring 113 wraps around the pin 141 in order to provide a rigid connection therebetween which is operative to effect concurrent rotation of the spring 113 and the output member 112.

The input end 116 of the spring 113 is connected to the sleeve 114. The sleeve 114 is apertured at 132. The input end 116 extends radially outwardly and into the aperture 132, thereby locking the spring 113 and the sleeve 114 together for concurrent rotation.

Braking of the sleeve 114 is effected by a brake coil spring 133. The brake spring 133 does not rotate with the sleeve 114 and is normally operative to brake the rotation of the sleeve 114 unless twisted about its ends to release the grip of its coils about the sleeve 114.

An annular mounting member is indicated schematically at 134. The member 134 is rigidly mounted to such supporting structure (not shown) as may be adjacent the clutch brake mechanism 110 in a given installation. The member 134 has a cylindrical outer surface 135 of the same diameter as outer surface 136 of the sleeve 114. The brake spring 133 is positioned around and in firm engagement with the surfaces 135, 136.

An anchoring end 137 of the spring 133 extends radially inwardly into an aperture 138 formed in the member 134 to secure the spring 133 against rotation relative to the member 134. A spring control end 139 of the spring 133 is formed into a hook-shaped configuration for connection with a control linkage (not shown). By this arrangement, when the control end 139 is twisted relative to the anchor end 137 in a direction opposite that indicated by the arrow 125, the grip of the brake spring coils about the sleeve 114 will be released thereby permitting the sleeve 114, the drive spring 113, and the output member 112 to rotate with the input member 111.

A lost-motion connection is provided between the sleeve 114 and the output member 112. Two slots 140 are formed through the sleeve 114, as best seen in FIG. 4. The ends of the pin 141 extend radially into the slots 140. The ends of the pin 141 normally each engage one end of the slots 140. During braking action, the sleeve 114 rotates relative to the output member 112 bringing the opposite ends of the slots 140 into engagement with the pin 141. By this arrangement, a lost-motion connection is provided which limits the twisting deflection of the drive spring 113 during braking, and also provides for positive braking of the output member 112 even if the drive spring 113 should fail.

As should now be apparent from the foregoing description, the embodiment of FIGS. 1 and 2 provides a clutch-brake mechanism which is normally operative to drivingly connect the input and output members 11, 12 until the sleeve 14 is braked. The embodiment of FIGS. 3 and 4, on the other hand, provides a clutch-brake mechanism which is normally inoperative to drivingly connect the input and output members 111, 112 until the brake spring 113 is released. Both embodiments serve to either selectively brake the output member or to drivingly connect the output member with the input member.

In accordance with still another feature of the present invention, a brake structure similar to the mechanism 110 can be provided by substituting a one-piece shaft 211, as shown in FIG. 5, for the input member 111, the output member 112, the spring 113 and the sleeve 114. A region 212 of enlarged diameter is formed on the shaft 211 to receive brake coil spring 133' in the same manner as the sleeve 114 in FIG. 3. This capability provides both brake and clutch-brake mechanisms having several identical parts and gives a conversion capability that permits replacement of clutch-brake mechanisms with brake mechanisms, or vice versa, to change the character of a drive system with a minimum of down time.

When the brake end 139 of the spring 133' is released, and braking action commences, the squeezing or clamping forces of the coil spring increase in each succeeding coil from top to bottom as viewed in FIG. 6. The coils at the lower end of the spring 133' are very tightly gripping the sleeve 134 and little if any force is applied to the spring anchor at its anchor end 137'. Accordingly, a loop 151 is provided at the anchor end 137' of the spring 133'. A pop rivet 150 projects through the loop to secure the anchor end 137' to the sleeve 134. While a pop rivet will only resist very low shear forces, because of the great gripping action at the lower end of the brake spring 133' as has been described, very low shear forces are applied and inexpensive and simple-to-install pop rivet provides a very adequate anchorage for the spring.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A combination clutch-brake device, comprising:
   a. an input member having a drive portion formed thereon including peripheral wall portions concentric about an axis;
   b. an output member positioned near said input member;
   c. said members being relatively rotatable about said axis;
   d. spring means connected to said output member for rotation therewith and having a coiled region extending around and in engagement with said drive portion to establish a driving connection therebetween which is normally operable, when said input member is rotated in a selected direction, to drive said output member;
   e. braking means for interrupting said driving connection and for braking the rotation of said output member, comprising:
      i. sleeve means positioned around said coiled region and connected to said spring means for rotation therewith;
      ii. restraining means selectively engageable with said sleeve means to restrain the movement thereof so as to release the grip of said coiled region on said drive portion thereby interrupting said driving connection, and to restrain the rotation of said output member; and,
   f. connection means providing a lost-motion connection between said sleeve means and said output member for limiting the relative rotation which occurs between said sleeve means and said output member when the grip of said coiled region about said drive portion is released;
   g. said connection means including a radially extending pin carried by said output member and extending into an elongate slot formed in said sleeve means such that relative rotation of said output member and said sleeve means will cause said pin ot move along said slot and into engagement with one end of said slot, whereby further relative movement of said sleeve means and said output member is prevented.

* * * * *